(12) United States Patent
Ording

(10) Patent No.: US 6,927,770 B2
(45) Date of Patent: Aug. 9, 2005

(54) INTERFACE PROVIDING CONTINUOUS FEEDBACK ON TASK PROGRESS IN A COMPUTER OPERATING SYSTEM

(75) Inventor: Bas Ording, Sunnyvale, CA (US)

(73) Assignee: Apple Computer Inc., Cupertino, CA (US)

( * ) Notice: Subject to any disclaimer, the term of this patent is extended or adjusted under 35 U.S.C. 154(b) by 521 days.

(21) Appl. No.: 09/754,052

(22) Filed: Jan. 5, 2001

(65) Prior Publication Data

US 2001/0055017 A1 Dec. 27, 2001

Related U.S. Application Data

(60) Provisional application No. 60/174,613, filed on Jan. 5, 2000.

(51) Int. Cl.[7] .............................................. G06T 13/00
(52) U.S. Cl. ...................................... 345/440; 345/772
(58) Field of Search ................................ 345/772, 213, 345/440

(56) References Cited

U.S. PATENT DOCUMENTS 5,528,744 A * 6/1996 Vaughton .................... 345/772
5,953,010 A * 9/1999 Kampe et al. ............... 345/772
6,038,588 A * 3/2000 Nagarajayya et al. ....... 718/102
6,396,518 B1 * 5/2002 Dow et al. ................... 345/772
6,492,983 B2 * 12/2002 Nishitani et al. ............ 345/213

OTHER PUBLICATIONS

Stopwatch Pointer: A Dynamic Progress Indicator, Jun. 1992, IBM, Technical Disclosure Bulletin NB920649.*
Apple Computer Inc., Application Kit Reference, 1997, Apple Computer Inc., pp 1–7.*

* cited by examiner

Primary Examiner—Almis R. Jankus
(74) Attorney, Agent, or Firm—Burns Doane Swecker & Mathis, LLP

(57) ABSTRACT

A user interface provides continuous feedback to a user regarding progress toward completion of a task being monitored in a status dialogue window. In one embodiment, the progress is indicated by a graphic element such as a progress bar, whose size is increased to fill a space of predetermined area by an amount corresponding to the percentage of the task completed, and a user is provided with feedback indicated that the computer operating system is performing the desired task by continuously varying the appearance of the progress bar. This provides the user with intuitive feedback that, regardless of any delays in the increase of the progress bar's size, the computer is continuing to perform the desired task.

22 Claims, 4 Drawing Sheets

INTERFACE PROVIDING CONTINUOUS FEEDBACK ON TASK PROGRESS IN A COMPUTER OPERATING SYSTEM

This application claims priority under 35 U.S.C. §§ 119 and/or 365 to 60/174,613 filed in the United States on Jan. 5, 2000; the entire content of which is hereby incorporated by reference.

FIELD OF THE INVENTION

The present invention relates generally to a user interface for computer operating systems, and in one particular aspect, to an interface element for notifying a computer user of the status of a task being executed.

BACKGROUND OF THE INVENTION

An important aspect of virtually every conventional personal and business computer is its ability to execute commands to perform tasks. One example of this is in the transfer and manipulation of data, such as copying a file from one location to another. The information that is to be copied on a computer may originate from a variety of sources, for example, a storage medium used within a hard disk drive, a floppy disk drive, a CD ROM drive, a computer's read only memory (ROM), a computer's random access memory (RAM), or other sources, such as a network drive. For instance, during the boot process of a computer, operating system files are loaded, i.e. copied, into the main working memory of the computer from a permanent storage medium, such as a hard disk drive. Once it is executing, the operating system of the computer may be instructed by the user to copy data files from a variety of sources to multiple destinations.

Many popular operating systems use a dialogue window to indicate the status of a function being performed by the computer. This window may indicate the status of the ongoing task in a variety of manners to the user. One example includes illustrating status using a "progress bar", which contains a moving bar that grows in size to indicate a percentage of the task either already performed or left to be performed. Generally, a progress bar is an animation that indicates, by filling an empty space of a fixed size, that a certain percentage of a task has been completed, which corresponds to the percentage of the space filled in. Another indication mechanism, used to indicate status of a task to the user, may include a numerical indication of the estimated amount of time left for the task to be completed.

One problem with the status indication given to a user during a task is that often the percentage of the task already performed, or yet to be performed, does not progress in a regular manner. This may be the case for a variety of reasons. For example, a file may take longer than expected to copy because of the time required to access the data on the device where it is stored. It may also be possible that the computer has a large amount of high priority processor-intensive applications running concurrently with the task, thereby preventing continuous execution of the task. Other delays may be caused by communication speed degradation or communication interruptions.

A problem with progressive status indicators for various tasks is that a status indicator that increases in size corresponding to a percentage of the task that is completed does not always appear to increase in a continuous manner to the user, due to delays associated with, for example, device access time, file transfer time, processor availability or communication speed. In a window designed to indicate status of a copying function to a user by means of a progress bar, for instance, the progress bar may appear to stop for some period of time. This may occur even though the copying operation is still active, giving the user the incorrect impression that copying has been stopped or delayed. This situation can occur quite often when copying files from a remote site by means of a shared communications medium, such as downloading files over the Internet. When a user initiates a file copy command, he or she may depend upon the progress bar to gauge whether or not the copying function is being performed correctly. Should the progress bar stop, a user may be inclined to believe incorrectly that the computer has terminated the copying function and may not be responding correctly, thereby motivating the user to take unnecessary actions, such as stop the task, re-establish a connection to a remote site, or restart the computer.

Accordingly, it is desirable to create a status indicator that provides continuous feedback to a user indicating that a task such as copying is being performed, and that this task on the computer is not suspended, requiring action on the part of the user. It is also desirable to provide this feedback in a manner intuitive to a user, such that it will be easy for the user to understand the computer is still performing the desired function or task which the status indicator is monitoring.

SUMMARY OF THE INVENTION

In accordance with the present invention, these objectives are achieved by a user interface that provides continuous feedback regarding a function or task being performed by a computer's operating system. This feedback is provided by means of an interface element that changes size and/or shape as portions of the task are completed, such as a progress bar. In addition to the physical changes that are related to the state of completion of the task, the element is animated to continuously change its appearance independently of the state of completion, indicating to a user that the computer is performing the desired function being monitored by a status dialogue window. The animation is continuous despite the fact that the rate at which the size or shape of the element changes, indicating the percentage of the task that has already been completed, may be slowed or even stopped. In this manner, if a progress indicator is stalled because of problems with communication speed or interruptions, device access time, or overall processor load, a user is able to determine that the desired function or task being monitored by the status dialogue window is still currently being performed by the computer.

Further features of the invention and the advantages offered thereby are explained in greater detail hereinafter with reference to specific embodiments illustrated in the accompanying drawings.

DETAILED DESCRIPTION OF THE PREFERRED EMBODIMENTS

To facilitate an understanding of the principles and features of the present invention, it is explained hereinafter with reference to its implementation in an illustrative embodiment. In particular, the invention is described in the context of a file copy status dialogue window within the Macintosh® operating system (Mac OS®) developed by Apple Computer, Inc. It will be appreciated, however, that this is not the only embodiment in which the invention can be implemented. Rather, it can be employed to represent the ongoing nature of any type of task, and be utilized in conjunction with a variety of different types of progress indicators, as will become apparent from an understanding of the principles which underscore the invention.

Figure 1:
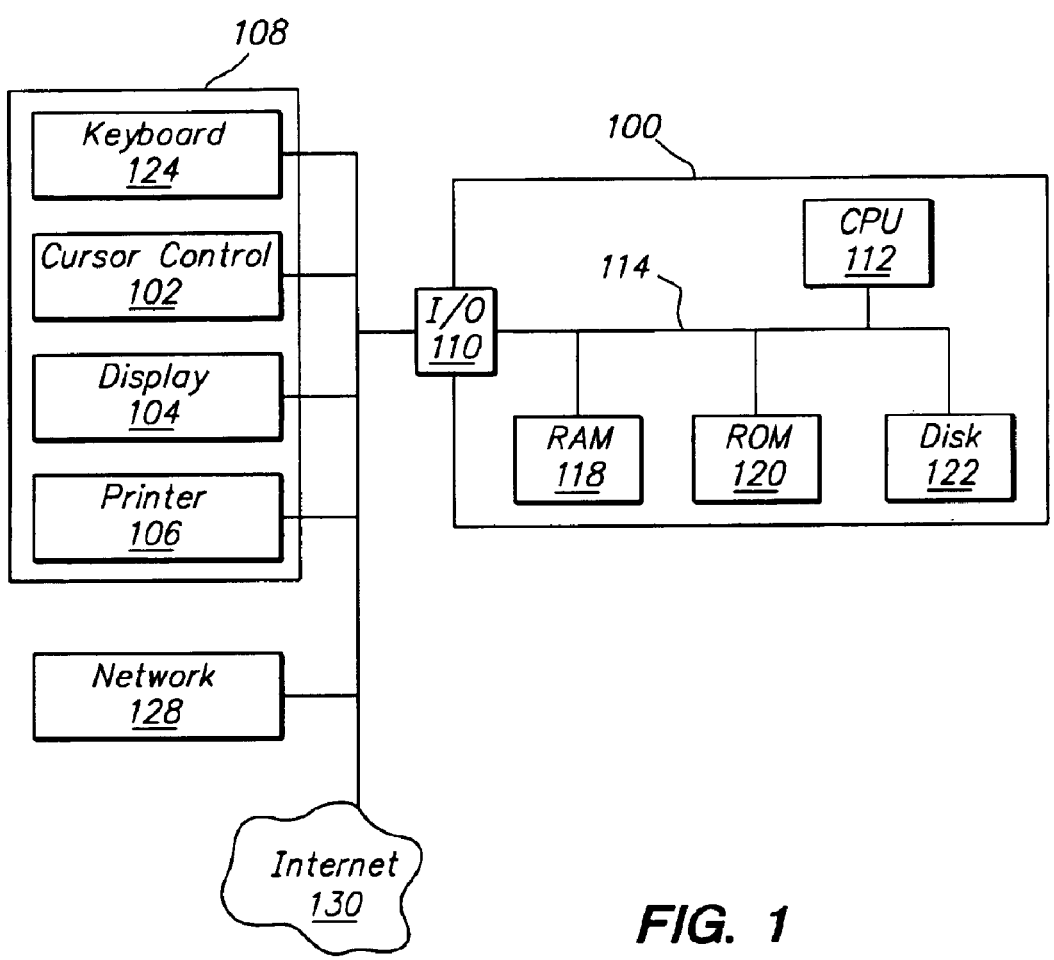
FIG. 1 is an exemplary computer system in which the system and method of the present invention may be employed.

An exemplary computer system of the type in which the present invention can be employed is illustrated in block diagram form in FIG. 1. The structure of the computer itself does not form part of the present invention. It is briefly described here for subsequent understanding of the manner in which features of the invention cooperate with the structure of the computer.

Referring to FIG. 1, the system includes a computer 100 having a variety of external peripheral devices 108 connected thereto. The computer 100 includes a central processing unit 112, a main memory which is typically implemented in the form of random access memory (RAM) 118, a static memory that comprises a read only memory (ROM) 120, and a permanent storage device, such as a magnetic or optical disk 122. The CPU 112 communicates with each of these forms of memory through an internal bus 114. The peripheral devices 108 includes a data entry device such as a keyboard 124, and a pointing or cursor control device 102 such as a mouse, trackball, trackpad or the like. A display device 104, such as a CRT monitor or an LCD screen, provides a visual display of the information that is being processed within the computer, for example the contents of a document, or the progress of a function or task. A hard copy of documents can be provided through a printer 106, or a similar device. Each of these external peripheral devices communicates with the CPU 112 by means of one or more input/output ports 110 on the computer. Input/output ports 110 also allow the computer 100 to interact with a local area network server or an external network 128, such as a LAN or WAN, or the Internet 130.

The computer 100 includes an operating system, which controls the allocation and usage of the hardware resources such as memory, central processing unit time, disk space, and peripheral devices. The operating system of the computer 100 allocates the various resources of the computer to functions or tasks required by the various devices, for instance when a user inputs a request by way of one of the peripheral devices 108. As previously mentioned, the operating system may control central processing unit time, which in the event of multiple, concurrent tasks or functions being run, may cause various individual functions having a relatively low priority to be slowed or suspended.

When a function or task is being performed, the operating system of the computer 100 may display a status dialogue window to indicate to a user the progress of the task as it is being completed. Two common situations in which a status window is displayed are when the computer is first starting up, and when files are being copied or moved into or from a memory device, such as the disk 122. For a copying operation, the status dialogue window may be of the type shown in FIG. 2A.

Figure 2A:
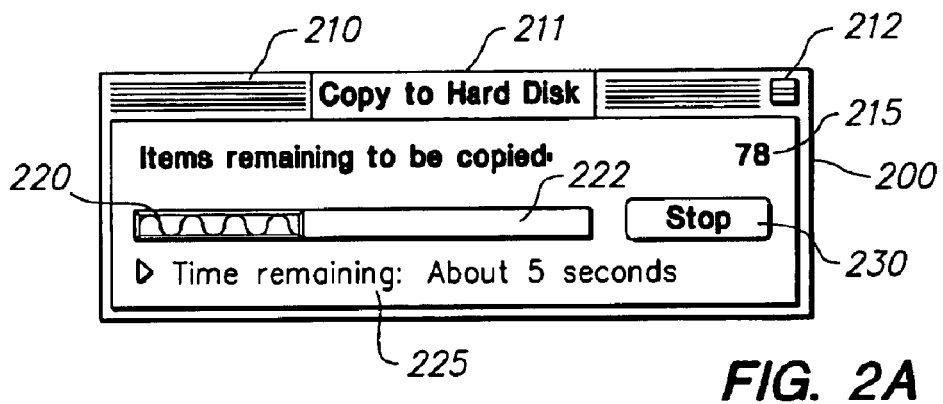
FIGS. 2A–2F are a series of user dialogue windows with an animated progress bar in accordance with one embodiment of the present invention.
Figure 2B:
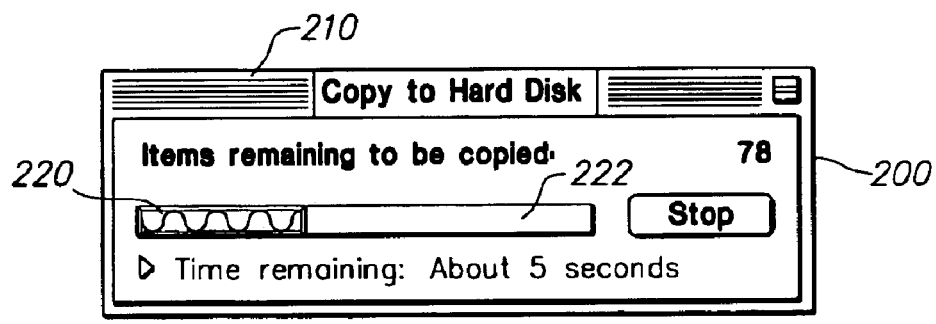
Figure 2C:
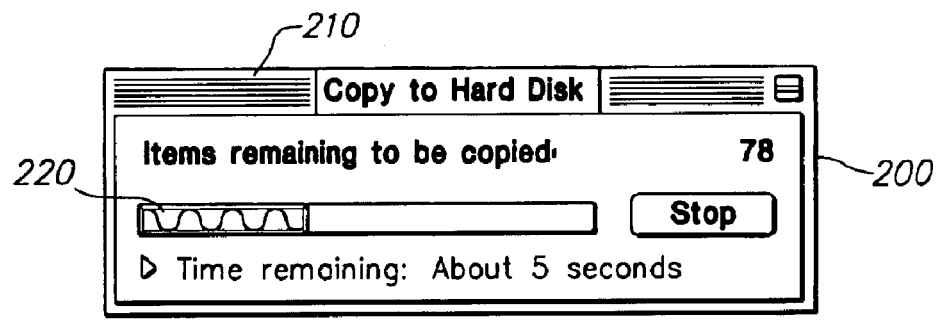
Figure 2D:
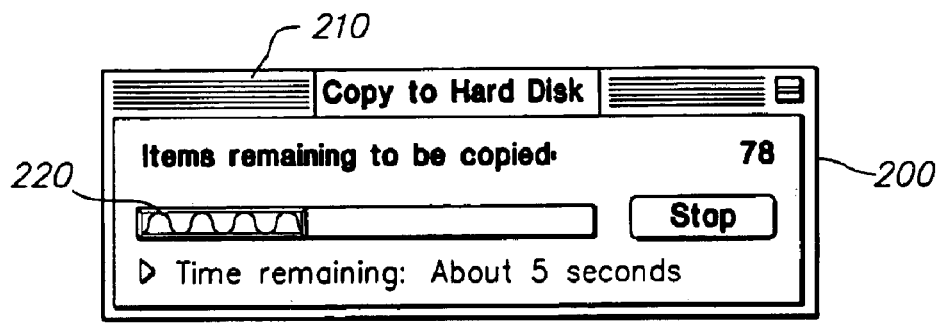

As can be seen in FIG. 2A, the window 200 has various features relating to the performance of the task of interest. For example, the window 200 includes a title bar 210 to display a title 211, in this case the function being performed. The title bar 210 also may contain various on-screen buttons, such as a resizing button 212 to selectively hide the window from view or minimize its size. The dialogue window 200 displays the status of a task to be completed, in this instance a copying function, in several different ways. One way is that an indicator 215 of the number of items remaining to be copied can be displayed. Also a progress bar 220 expands within a space of fixed size 222 as the task is being carried out, thereby indicating a percentage of a task already completed. This percentage might be determined relative to the total number of files to be copied, or relative to the total amount of processor time needed to make the copies. Additionally, the estimated time 225 remaining to complete the task can be displayed to the user. On-screen buttons for various commands may be provided within the dialogue window such as a stop button 230 to interrupt the task currently being performed by the operating system.

The task status window depicted in FIG. 2A is representative of "thermometer" type status indicators, in which the progress bar 220 grows linearly within the space 222 to indicate the percentage of the task which has been completed. Other types of progress indicators having an element which changes size and/or shape to depict the progression of the task can be employed within the context of the invention as well. Examples of such include a "pie-chart" type of indicator, in which radial slices are added to or removed from a circular object as the task progresses, and an hourglass-type of indicator in which "sand" shifts from the top to the bottom of a space. It will be appreciated, therefore, that the status indicator of FIG. 2A is exemplary of a variety of different types of indicators that can be utilized.

FIGS. 2A–2D represent the state of the status window at sequential times during the performance of the task. For the various reasons discussed previously, the progress bar may not regularly increase to fill a greater portion of the space 222 during a period of time while the task is being carried out. When the progress bar 220 stops increasing in size, a user may be led to believe that the function being performed by the operating system, in this case copying, has been halted, or that the computer is in a locked state. Such a belief may prompt the user to stop the present function by use of the on-screen stop button 230, and to restart the operation. However, in some cases this may be premature and waste time, and if a user were aware of the fact that the present task is still being performed, he or she would likely not feel a need to interrupt the task.

In order to prevent the premature interruption of a task by a user because of a stalled progress bar 220, in accordance with the invention continuous feedback may be used to inhibit the user from incorrectly assuming that the desired task being monitored by the dialogue window is no longer being performed. As shown in FIGS. 2A–2F, the progress bar 220 includes a varying pattern to provide this continuous feedback. In the particular example of FIGS. 2A–2D, this varying pattern is a sinusoidal wave form which changes over time. In this case, the sinusoidal wave form appears to continuously oscillate within the progress bar 220, e.g. the pattern moves from right to left. This provides feedback to the user that the computer is still performing the desired task indicated in the status window, even if the particular parameter indicated by the progress bar is currently delayed, for whatever reason. In this manner, a user, while noting that the progress bar 220 has temporarily ceased to fill the space 222, will see the variation in the appearance of the progress bar 220 itself, and realize that the computer is still actively attending to the desired task.

It will be appreciated that the variation of the progress bar's appearance may take on many forms, of which the sinusoidal wave form shown in FIGS. 2A–2F is just one. For example, the pattern of the progress bar 220 can be varied such that it changes colors over time or it could vary through a progression of gray scale patterns. The progress bar may vary in such a manner that it appears to "fill up" with pixels in an increasingly darkened gray scale pattern changing from a light gray to black, and then reverse. Different animation patterns can be selected in accordance with different selectable appearances, or "themes," for a desktop, as described in U.S. Pat. No. 5,959,624, for example. Each different theme can have a different respective pattern that is displayed in the area of the progress bar 220 to provide continuous animation.

Figure 2E:
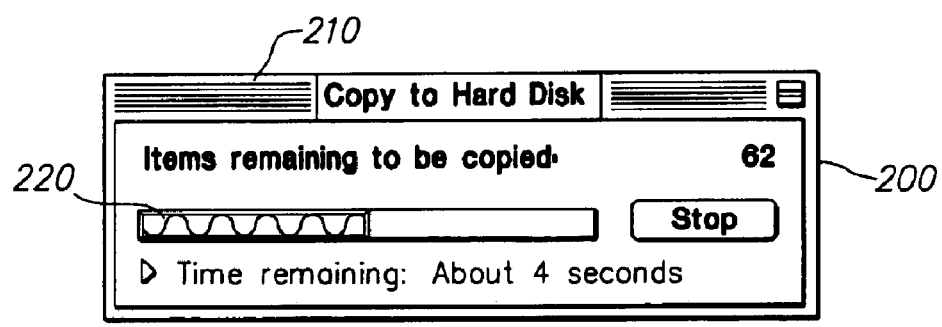
Figure 2F:
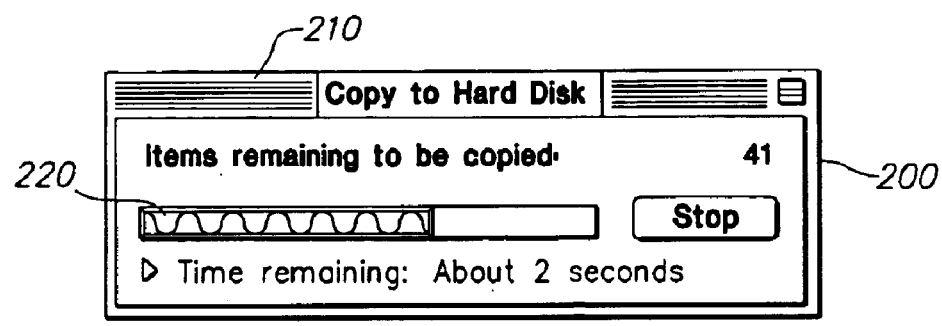

The variation of the pattern on the progress bar 220 is continuous and independent of whether the progress bar's length is stationary or increasing. This result is preferably accomplished in a multitasking environment, using separate threads, or processes, to perform the task of interest and the display of progress, respectively. When a task is initiated, such as a copying or downloading operation, two threads are launched. One thread performs the actual copying operation itself, and provides updates on the progress of the task, e.g. the percentage which is completed and/or the estimated time remaining. The second thread controls the display of the status indicator, and receives the updates from the first thread to change the length of the progress bar 220 accordingly. This second thread also controls the pattern displayed within the area of the progress bar 220, independently of the first thread. For instance, the second thread can register to receive clock ticks from the computer's CPU, and can shift the pattern within the area of the progress bar 220 one pixel to the left at a specified rate. For instance, the shift can occur every thirtieth of a second, to thereby provide animation at a normal frame rate. Thus, as depicted in FIGS. 2A–2D, the progress bar 220 and the numerical indicator 215 are static for a period of time, for example while waiting for a remote server to deliver the next file. However, the sinusoidal pattern within the progress bar continues to oscillate, thereby informing the user that the task is still active. Then, as depicted in FIGS. 2E and 2F, as the copying resumes and the percentage of the completed task increases, the progress bar moves to the right, in response to information from the first thread. During this time the sinusoidal pattern continues to oscillate as well, in response to the clock ticks.

If the task becomes inactive, e.g. the computer stalls or the copying operation times out, the variation of the pattern will stop. This provides positive feedback to the user that a problem has occurred, and remedial action should be taken, e.g. click on the stop button 230 or reboot the computer.

Figure 3:
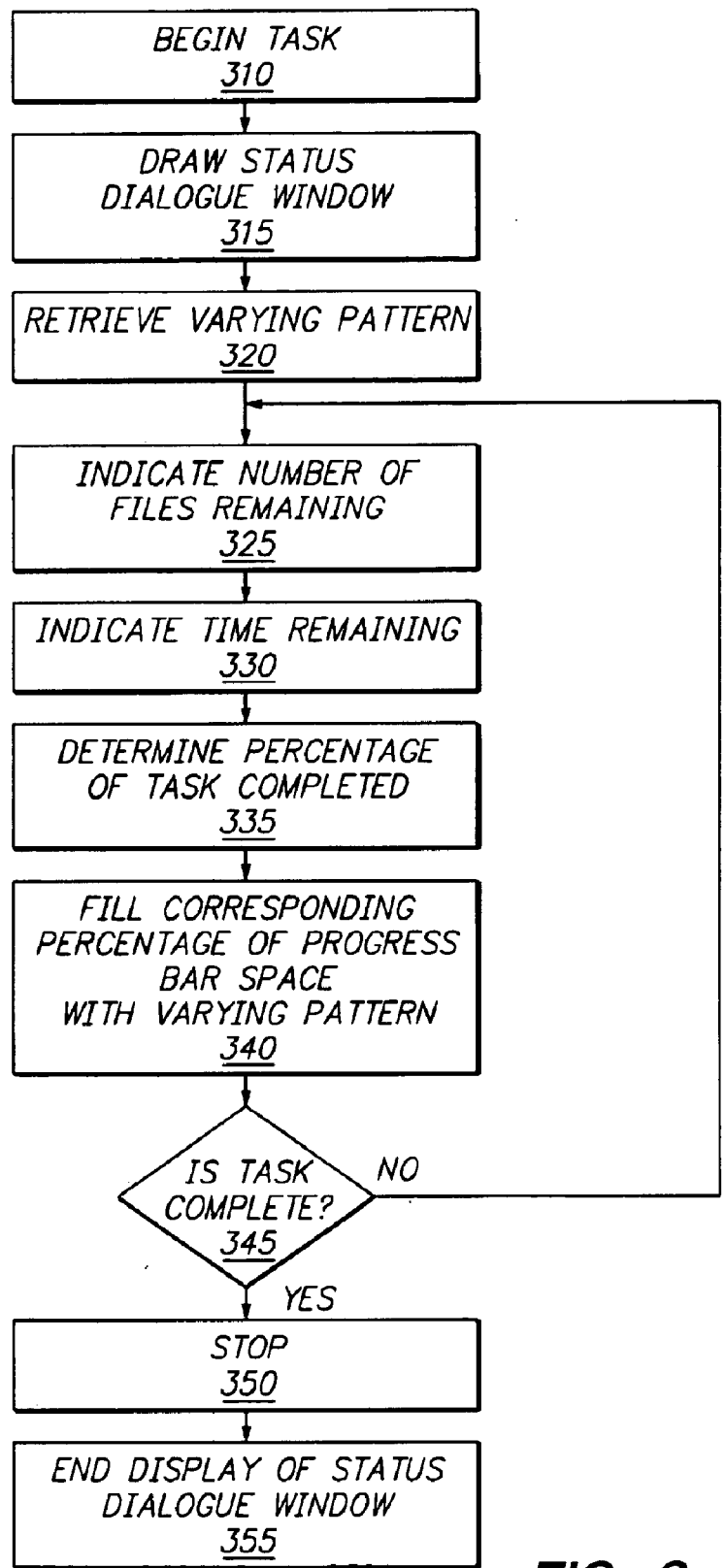
FIG. 3 is a flowchart of the method performed by one embodiment of the present invention.

FIG. 3 is a flowchart showing the method by which continuous feedback is presented to a user, by way of varying the appearance of a progress bar in a status window such as the window shown in FIGS. 2A–2F. As can be seen in step 310 of FIG. 3, a task is typically begun in response to an event, such as user input from the cursor control device 102 or keys on the keyboard 124. This event initiates the launching of the two threads, discussed previously. Once the task is begun, a status dialogue window is drawn by one of the threads, as shown in step 315. At step 320, the operating system retrieves the pattern that is to be used for the progress bar 220. The pattern can comprise a sequence of successive images, or a single image that can be translated within a defined area to create the impression of an animation. In the case of a multi-image sequence, when the pattern is first retrieved, a system index points to the first image in the sequence. Each time a predetermined event occurs, e.g. the computer's internal clock is updated, the index is incremented by the thread to point to the next image in the sequence. For a single image implementation, a reference location for the image can be shifted by one pixel. These processes continue in a cyclic manner, to thereby vary the pattern.

The parameter that is used to measure the progress of the task is obtained from the other thread that is running. For instance, if the task is a copying operation, the number of files to be copied can be used. Hence, in step 325 the number of files remaining to be operated on by the current task is indicated. The approximate amount of time remaining is estimated and indicated to the user in step 330. In step 335, the completed percentage of the task is calculated, and at step 340 the corresponding percentage of the space 222 is filled with the image identified by the index pointer, to indicate the progress bar. Since the index is continually updated in accordance with the system clock, the resulting pattern of the progress bar appears to constantly vary, regardless of its length.

A decision is made at step 345 whether the task is complete as reported by the other thread. If the task is not complete, then the indicative parameter is measured and displayed at step 325, the time remaining is updated at step 330 and the percentage of the task completed is recalculated at step 335. The space provided for the progress bar is further filled, as shown at step 340, with the varying pattern corresponding to the percentage of the task completed, as determined at step 335. If the task is completed, then the task is stopped at step 350 and the status dialogue window is no longer displayed, as shown in step 355. Both threads are then terminated. It will be recognized by those skilled in the art that the task being monitored by the status dialogue box may be stopped, and the status dialogue window closed, by the user pressing an on-screen button to request that the task be stopped, such as the stop button 230 shown in FIGS. 2A–2F.

In the method described in conjunction with FIG. 3, various indicators of the progress of the task being performed are shown to the user. For example, the number of files remaining to be operated on, the time remaining, and the percentage of the task completed are all shown in the status dialogue window. It will be recognized by those skilled in the art, however, that the progress bar alone may be sufficient. Furthermore, a variety of different indicators, including various graphical representations which change size and/or shape to represent the state of completion of the task, may be shown within the status dialogue window, and are encompassed by the method of the present invention, in that they too can be given a continuously varying appearance to provide continuous feedback to the user that the task is being performed by the computer operating system.

It will be appreciated by those of ordinary skill in the art that the present invention can be embodied in other specific forms without departing from the spirit or essential characteristics thereof. For example, the invention has been described in the context of a dialogue window indicating the status of a copying task or function by varying the pattern of a progress bar within a status dialogue window. The particular type of variation within the status dialogue window, however, is not critical to the operation of the present invention, nor is the type of computer or operating system within which it is implemented. For example, a varying pattern could appear in the unfilled space 222, in lieu of or in addition to the pattern on the progress bar 220. Moreover, the type of task or function whose status is indicated to a user by way of the varying pattern within a status dialogue window is not critical to the invention. For illustration purposes only, a copying function has been described in accordance with one embodiment of the present invention. However, a variety of different types of tasks being performed by the operating system, whose status is indicated to the user by way of a status dialogue window, can utilize the continuous feedback of a varying status indicator. Some such functions or tasks may include, but are not limited to the progress of downloading files within a network or on the Internet, the installation of various programs on a particular computer, the loading of an application within the operating system of a computer, or the establishing of a computer-to-computer network connection.

The varying pattern can also be used to provide an aesthetically pleasing effect on various control elements. For instance, one control element that is frequently accessed by users is the movable portion, or "thumb" on a scroll bar, for viewing different portions of a window. In accordance with another aspect of the invention, a varying pattern can be applied to the area of the thumb, to more readily call the user's attention to it.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for notifying a user of the status of a task being performed on a computer, comprising:
   at least one status indicator contained within a status dialogue window, wherein said status indicator includes an element that changes at least one of size or shape to visibly indicate the state of completion of the task, and
   a pattern that is displayed concurrently with said element and continuously varied independently of said state of completion to indicate to a user that the task is currently active, wherein said task is carried out in a multitasking environment, and wherein operations to complete the task are performed by a first thread within said environment, and the display of said indicator and variation of said pattern is performed by a second thread within said environment, the first and second threads being operated on in parallel.

2. The system of claim 1, wherein said status indicator element is a progress bar.

3. The system of claim 2, wherein said progress bar is expanded to fill a portion of a predefined progress bar space, and wherein the portion of said predefined progress bar space that is filled corresponds to the percentage of the task that has been completed.

4. The system of claim 1, wherein said continuous variation is a change in color of said status indicator element.

5. The system of claim 1, wherein said continuous variation is a change in a graphical pattern of said status indicator element.

6. The system of claim 1 wherein said pattern is continuously varied by displaying successive images in a sequence of images in response to a clock signal.

7. The system of claim 1 wherein said pattern is continuously varied by periodically shifting the location of an image in response to a clock signal.

8. The system of claim 1 wherein said pattern is displayed on said element.

9. The system of claim 1 wherein said pattern is displayed in an area that is complementary to said element.

10. A method for indicating to a user the status of a task being performed on a computer, comprising the steps of:
    displaying a status dialogue window;
    varying at least one of size or shape of a status indicator element contained in said status dialogue window, in accordance with the percentage of a task completed; and
    continuously varying the appearance of the status indicator element, independently of said percentage, to indicate to a user that the task is currently active, wherein said task is carried out in a multitasking environment, and wherein operations to complete the task are performed by a first thread within said environment, and the display of said indicator and variation of said pattern is performed by a second thread within said environment, the first and second threads being operated on in parallel.

11. The method of claim 10, wherein said status indicator element is a progress bar.

12. The method of claim 11, wherein said progress bar fills a portion of a predetermined progress bar space by an amount corresponding to the percentage of the task that has been completed.

13. The method of claim 10, wherein the variation of the appearance of said status indicator element comprises a change in a graphical pattern of the status indicator element.

14. The method of claim 10, wherein the variation of the appearance of said status indicator element comprises a changing of color of the status indicator element.

15. The method of claim 10, wherein said task is carried out in a multitasking environment, arid wherein operations to complete the task are performed by a first thread within said environment, and the display of said indicator and variation of said pattern is performed by a second thread within said environment.

16. The method of claim 10, wherein said pattern is continuously varied by displaying successive images in a sequence of images in response to a clock signal.

17. The method of claim 10, wherein said pattern is continuously varied by periodically shifting the location of an image in response to a clock signal.

18. A computer-readable medium containing a program which executes the following process:
    displaying a status dialogue window;
    varying at least one of size or shape of a status indicator element contained in said status dialogue window, in accordance with the percentage of a task completed; and
    continuously varying the appearance of the status indicator element, independently of said percentage, to indicate to a user that the task is currently active, wherein said task is carried out in a multitasking environment, and wherein operations to completed the task are performed by a first thread within said environment, and the display of said indicator and variation of said pattern is performed by a second thread within said environment, the first and second threads being operated on in parallel.

19. The computer-readable medium of claim 18, wherein said status indicator element is a progress bar that is increased in size within a predetermined progress bar space to fill a portion of said predetermined progress bar space by an amount corresponding to the percentage completed of said task.

20. The computer-readable medium of claim 18, wherein said task is carried out in a multitasking environment, and wherein operations to complete the task are performed by a first thread within said environment, and the display of said indicator and variation of said pattern is performed by a second thread within said environment.

21. The computer-readable medium of claim 18, wherein said pattern is continuously varied by displaying successive images in a sequence of images in response to a clock signal.

22. The computer-readable medium of claim 18, wherein said pattern is continuously varied by periodically shifting the location of an image in response to a clock signal.

* * * * *